US012557004B2

(12) United States Patent
Allasia et al.

(10) Patent No.: US 12,557,004 B2
(45) Date of Patent: Feb. 17, 2026

(54) METHOD AND SYSTEM FOR DELIVERING DEDICATED SERVICES RESTRICTED TO A SERVICE AREA

(71) Applicant: TELECOM ITALIA S.p.A., Milan (IT)

(72) Inventors: Andrea Allasia, Turin (IT); Sergio Barberis, Turin (IT); Nicola Pio Magnani, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 488 days.

(21) Appl. No.: 18/000,110

(22) PCT Filed: May 18, 2021

(86) PCT No.: PCT/EP2021/063171
§ 371 (c)(1),
(2) Date: Nov. 28, 2022

(87) PCT Pub. No.: WO2021/239522
PCT Pub. Date: Dec. 2, 2021

(65) Prior Publication Data
US 2023/0180102 A1 Jun. 8, 2023

(30) Foreign Application Priority Data

May 28, 2020 (IT) .................. 102020000012766

(51) Int. Cl.
H04W 48/04 (2009.01)
H04W 4/02 (2018.01)
H04W 4/029 (2018.01)

(52) U.S. Cl.
CPC .......... *H04W 48/04* (2013.01); *H04W 4/023* (2013.01); *H04W 4/029* (2018.02)

(58) Field of Classification Search
CPC ...... H04W 4/023; H04W 4/029; H04W 48/04
See application file for complete search history.

(56) References Cited

U.S. PATENT DOCUMENTS 10,937,049 B2 * 3/2021 Scipioni ............. G06Q 30/0238
12,159,499 B1 * 12/2024 Lemberger ............. G06V 20/52
(Continued)

OTHER PUBLICATIONS

International Search Report Issued Aug. 26, 2021 in PCT/EP2021/063171, filed on May 18, 2021, 3 pages.

*Primary Examiner* — Dai Phuong
(74) *Attorney, Agent, or Firm* — Oblon, McClelland, Maier & Neustadt, L.L.P.

(57) ABSTRACT

A method for delivering to a user, through a mobile communication network, a dedicated service restricted to an access-controlled service area includes, upon detection of an access of the user into the access-controlled service area by an access control system, controlling accesses of users to the access-controlled service area, identifying a connectable device associated with the user. The connectable device is connected to the mobile communication network. Then a position of the connectable device is determined. If, based on the position of the connectable device, the connectable device is within the access-controlled service area, the dedicated service is delivered to the user by, providing, through the mobile communication network, one or more digital contents to the connectable device.

9 Claims, 2 Drawing Sheets

(56) References Cited

U.S. PATENT DOCUMENTS

Figure 1:
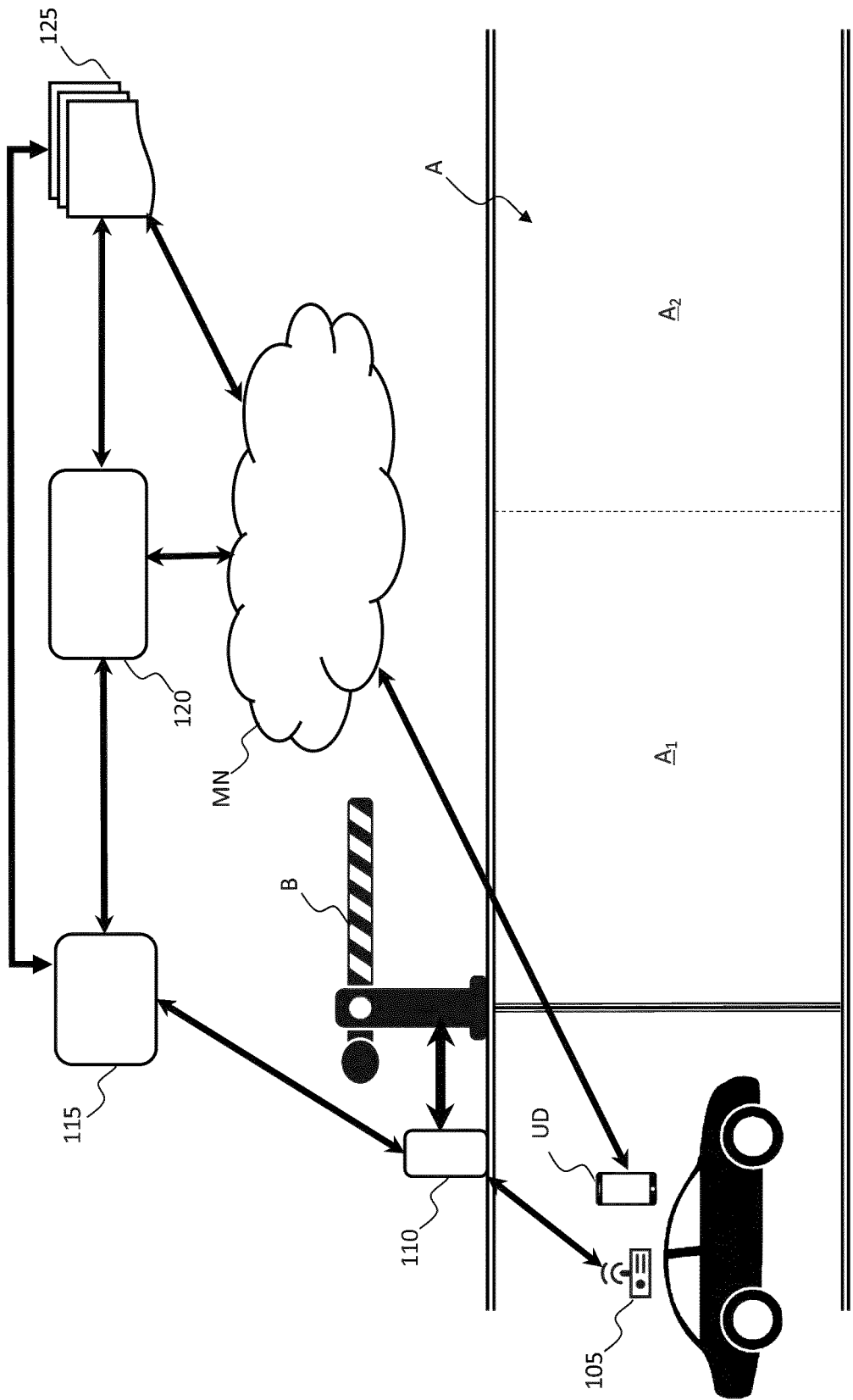

| | | | |
|---|---|---|---|
| 2015/0228274 A1* | 8/2015 | Leppanen | G10L 15/06 704/243 |
| 2016/0171787 A1* | 6/2016 | Yohalashet | G07B 15/063 705/13 |
| 2019/0182526 A1* | 6/2019 | Sarosi | H04N 21/433 |
| 2019/0340876 A1 | 11/2019 | Northrup et al. | |
| 2020/0107150 A1* | 4/2020 | Jensen | H04W 4/44 |
| 2025/0220024 A1* | 7/2025 | Simons | H04L 9/3226 |

* cited by examiner

METHOD AND SYSTEM FOR DELIVERING DEDICATED SERVICES RESTRICTED TO A SERVICE AREA

BACKGROUND OF THE INVENTION

Field of the Invention

The present invention generally relates to a method and system for delivering dedicated services restricted to a predefined service area. More particularly, the present invention relates to a method and system for delivering dedicated services to an access-controlled service area, such as an access-controlled service area delimited by one or more access barriers.

Overview of the Related Art

The delivery of dedicated services restricted or provided limitatively to a predefined service area including, for example, buildings or premises such as a university campus, an industrial site, a museum, a station or an airport encompasses different aspects such as radio coverage, provision of performance tailored to the dedicated service and/or to user needs, identification of users having different access rights, and technological solutions to ensure coexistence of different dedicated services sharing same network infrastructures.

Solutions are known in the art for the delivery of context services.

US2003220835 discloses a system, method, apparatus and computer program product for providing location based functions and mobile e-commerce comprising a central processing unit including a processor, a storage device, and programming stored in the storage device, a display device, an audio input device, an audio output device, a communications module, a commerce module, an image module, and a location module. The programming controls the operation to provide functions based on location data, to facilitate commercial exchanges by wirelessly exchanging payment and product information with venders, to identify services such as venders meeting selection criteria, to wirelessly exchange select information with other users and systems, to restrict and/or monitor the use of the device based on authorized user parameters, selecting one of a plurality of networks through which to communicate, detecting a trigger for performing an action based on a change in location and sensed data, storing a voice annotation with a computer data file, determining service providers and associated communication parameters, contemporaneously maintaining a wireless voice and data link, providing a system for selecting and delivering mobile advertisements, and many other functions and services.

EP2624534 discloses methods and systems for extracting mobile communication terminal identifiers from mobile terminals carried on individuals. The disclosed techniques refer to communication terminals that communicate over both a cellular network and a Wireless Local Area Network (WLAN). An interrogation device intercepts the communication of such a communication terminal at a defined location and at a defined time. The interrogation device extracts from the intercepted communication two types of identifiers—a cellular identifier that identifies the terminal in the cellular network, and a WLAN identifier that identifies the terminal in the WLAN. A correlation system correlates the cellular and WLAN identifiers, and output the correlation for later use.

Sachin W. Rahate, Dr. M. Z. Shaikh, "*Geo-fencing Infrastructure: Location Based Service*", International Research Journal of Engineering and Technology (IRJET), Volume: 03 Issue:11, November 2016 discloses the use of geo-fence, which can be generated as per user's need by considering different radius, or can be a predefined set of boundaries.

SUMMARY OF INVENTION

The Applicant has found that none of the solutions known in the art investigates the delivery of dedicated services to access-controlled service areas, such as access-controlled service areas which are delimited by one or more access barriers (such as roads, limited traffic areas and industrial premises) and in which user access is controlled and detected by an existing access control system.

In this respect, the Applicant has devised a method and system for delivering to a user, through a mobile communication network, a dedicated service restricted to an access-controlled service area (such as an access-controlled service area delimited by one or more access barriers) wherein the user access is controlled (e.g., detected) by an external and separate access control system.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for delivering to a user, through a mobile communication network, a dedicated service restricted to an access-controlled service area. The method comprises: upon detection of an access of the user into the access-controlled service area by an access control system controlling accesses of users to the access-controlled service area, identifying a connectable device associated with the user, the connectable device being connected to the mobile communication network; determining a position of the connectable device, and if, based on the position of the connectable device, the connectable device is within the access-controlled service area, delivering the dedicated service to the user, said delivering the dedicated service comprising providing, through the mobile communication network, one or more digital contents to the connectable device.

According to an embodiment, whose features are additional or alternative to any features of the previous embodiments, said determining a position of the connectable device is based on position information determined according to at least one among:
  GNSS signals;
  beacon signals, and
  network signals exchanges between the connectable device and the mobile communication network.

According to an embodiment, whose features are additional or alternative to any features of the previous embodiments, said position information is determined at the connectable device and/or at the mobile communication network.

According to an embodiment, whose features are additional or alternative to any features of the previous embodiments, said identifying a connectable device associated with the user further comprises checking whether the connectable device is in proximity of the user.

According to an embodiment, whose features are additional or alternative to any features of the previous embodiments, said identifying a connectable device associated with the user comprises identifying, among a plurality of connectable devices associated with the user, the connectable device that is in proximity to the user.

According to an embodiment, whose features are additional or alternative to any features of the previous embodiments, said identifying a connectable device associated with the user is based on said determining a position of the connectable device.

According to an embodiment, whose features are additional or alternative to any features of the previous embodiments, the access-controlled service area comprises at least a first and a second service sub-areas. Said delivering the dedicated service to the user comprises transmitting, to the connectable device, first or second digital contents of said one or more digital contents depending on the first or second service sub-area, respectively, where the connectable device is located.

According to an embodiment, whose features are additional or alternative to any features of the previous embodiments, the access-controlled service area is delimited by one or more access barriers, said one or more access barriers for example comprising one or more physical and/or virtual access barriers.

According to an embodiment, whose features are additional or alternative to any features of the previous embodiments, the access control system comprises an electronic toll collection system, the access-controlled service area for example comprising a toll road.

Another aspect of the present invention relates to a system for delivering to a user a dedicated service restricted to an access-controlled service area. The system comprises:
- an identification module configured to, upon detection of an access of the user into the access-controlled service area by an access control system controlling accesses of users to the access-controlled service area, identify a connectable device associated with the user and determine a position of the connectable device;
- a mobile communication network connected to the connectable device;
- a content module configured to deliver the dedicated service to the user if, based on the position of the connectable device, the connectable device is within the access-controlled service area, the content module being configured to deliver the dedicated service to the user by transmitting, through the mobile communication network, one or more digital contents to the connectable device.

BRIEF DESCRIPTION OF THE ANNEXED DRAWINGS

Figure 2:
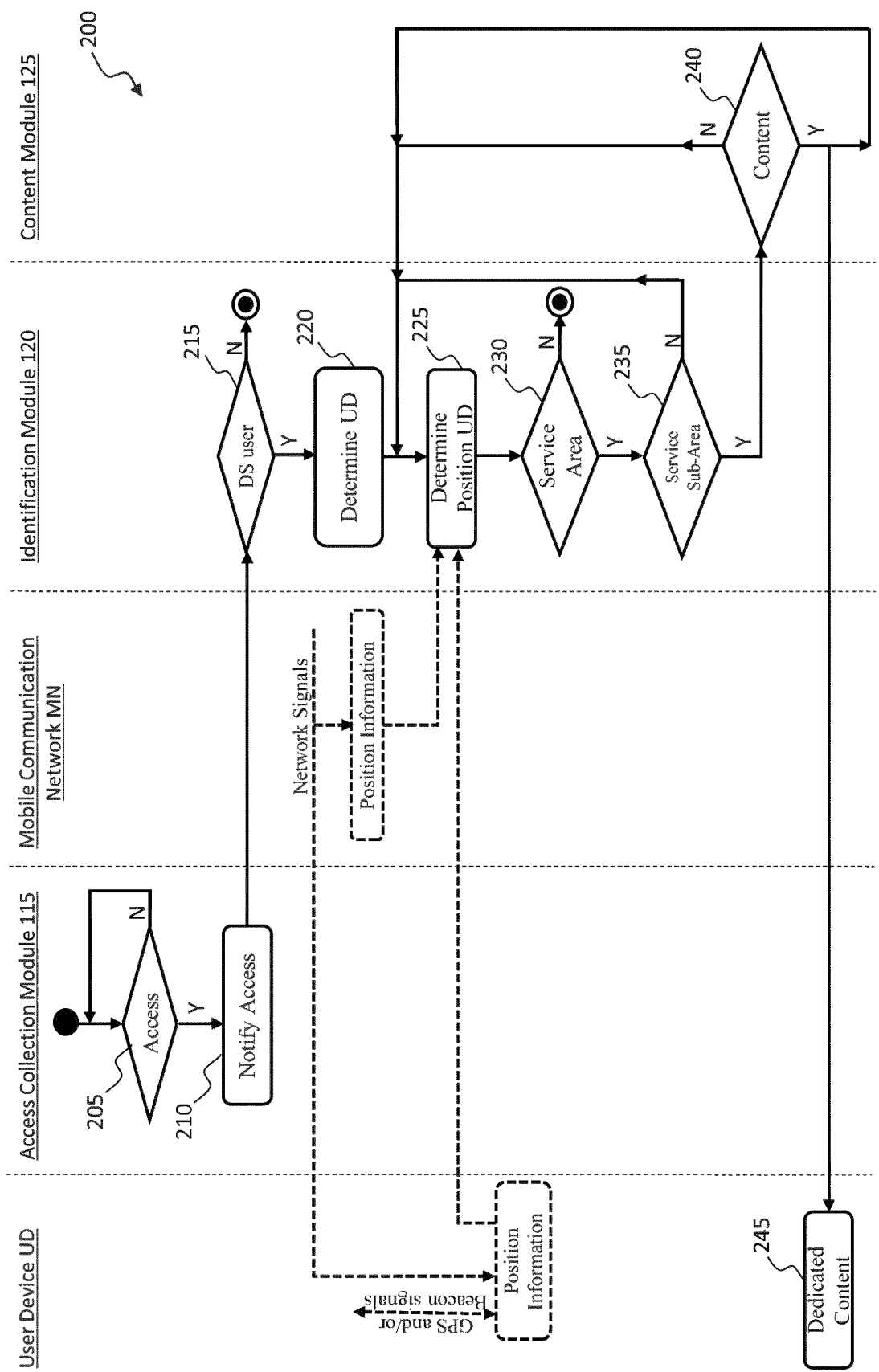

These and other features and advantages of the present invention will be made apparent by the following description of some exemplary and non-limitative embodiments thereof; for its better intelligibility, the following description should be read making reference to the attached drawings, wherein:

FIG. 1 shows, according to an embodiment of the present invention, a system aimed at delivering to a user a dedicated service restricted to an access-controlled service area, and FIG. 2 shows a swimlane activity diagram of a procedure according to an embodiment of the present invention.

DETAILED DESCRIPTION OF PREFERRED EMBODIMENTS OF THE INVENTION

FIG. 1 shows, according to an embodiment of the present invention, a system (hereinafter, DS ("Dedicated Service") system) aimed at delivering to a user a dedicated service restricted to an access-controlled service area (hereinafter, service area) A.

In the following, when one or more features of the DS system (as well as of modules thereof and/or method steps implemented by it) are introduced by the wording "according to an embodiment", they are to be construed as features additional or alternative to any features previously introduced, unless otherwise indicated and/or unless there is evident incompatibility among feature combinations.

According to an embodiment, the service area A is delimited by one or more access barriers, such as the access barrier B. Access barriers may for example comprise physical access barriers, such movable gates, doors or bars, or virtual access barriers.

The service area A may for example comprise, but is not limited to, roads (such as highways or motorways), limited traffic areas and industrial premises. In the following, reference will be made by way of example only to a road (e.g., a toll road) as the service area A, and to a user travelling in it by his/her own vehicle.

The dedicated service may for example comprise, but is not limited to, digital contents (such as voice, video, messaging and multimedia broadcast) concerning the service area A, such as road traffic information, weather forecasts along the road, nearby present or future events, payment (such as toll payment) processing. According to an embodiment, as better discussed in the following, the user is allowed to customize the type of dedicated service to be received while in the service area A.

According to an embodiment, the DS system is configured to deliver the dedicated service to the user by transmission of corresponding digital data to one or more connectable devices accessible by the user. As better understood from the following disclosure, by connectable device accessible by a user it is herein meant the condition in which the connectable device is available to the user, so that the user can interact with (i.e., use) the connectable device to consult (e.g., browse or check or read or see or listen the digital contents of the dedicated service).

According to an embodiment, the connectable device comprises a user device, such as the user device UD.

The user device UD may for example be a mobile phone, a smartphone, a tablet, a personal digital assistant (PDA), or a laptop computer, or any other portable or mobile device having processing, input/output and memory modules adapted to support different messaging protocols (such as push notifications), as well as to run software applications (e.g., mobile applications in the example at issue of a mobile device as user device UD).

The user device UD is associated with the user, the user being for example the owner of the user device UD.

According to an embodiment, the connectable device, such as the user device UD, has connection capabilities to a mobile communication network MN.

According to an embodiment, delivery of the dedicated service to the connectable device takes place through the mobile communication network MN.

According to an embodiment, the connectable device may have beacon signal transmission/reception capabilities for transmitting/receiving beacon signals.

According to an embodiment, the connectable device comprises a position module (not shown), which may for example be configured to provide position information regarding a position of the connectable device. The position information may for example comprise a geographic position of the connectable device. The geographic position may for example be expressed in terms of geographic coordinates (such as longitude, latitude and altitude).

According to an embodiment, the position module comprises a GNSS ("Global Navigation Satellite System") receiver, the position information being for example based on GNSS signals received at the GNSS receiver.

According to an embodiment, the GNSS receiver comprises a GPS ("Global Positioning System") receiver, the position information being for example based on GPS signals received at the GPS receiver.

According to an embodiment, exchange of information (such as the position information) between the connectable device and one or more modules of the DS system takes place through the mobile communication network MN.

According to an embodiment, the position information is based at least partly on the beacon signals.

According to an embodiment, the position information is based at least partly on radio frequency signal exchange between the user device UD and the mobile communication network MN (hereinafter, network signals). According to an embodiment, the network signals comprise data and/or measurements at the mobile communication network MN: just as an example, the position module may determine the position of the connectable device based (also) on the timing of signals received from two or more nearby base stations of the mobile communication network MN.

According to an embodiment, not shown, the connectable device, such as the user device UD, is communicably coupled to an external device provided with notification functionalities, i.e. a notification device, external to the user device UD, configured to deliver notification to the user in an immediate manner and with reduced human intervention. According to an embodiment, the external notification device comprises one or more wearable smart devices (such as a smartwatch, a wristband, a ring, in-ear headphones), or one or more in-vehicle infotainment (IVI) devices.

According to an embodiment, an IVI device properly equipped with autonomous connection capabilities to the mobile communication network MN (e.g., through a dedicated SIM card) may act as (i.e., in place of) the user device UD.

According to an embodiment, a plurality of user devices UD (such as a plurality of different connectable devices) may be associated with a same user during a subscription phase of that user to the dedicated service (whereby, as better discussed in the following, the dedicated service may be delivered to the user through one or more of the plurality of associated user devices, such as through one or more user devices, among the plurality of devices, that are actually close to or in proximity of the associated user and, hence, that are actually accessible by him/her (or by one or more persons with him/her) while in the service area A). As it should be understood, the plurality of different connectable devices associated with a same user may also comprise user devices belonging to one or more family members of the user.

According to an embodiment, the mobile communication network MN may be based on any suitable radio access technology. Examples of radio access technologies comprise UTRA ("UMTS Terrestrial Radio Access"), WCDMA ("Wideband Code Division Multiple Access"), CDMA2000, GERAN ("GSM EDGE Radio Access Network"), LTE ("Long Term Evolution"), LTE-Advanced, and NR ("New Radio").

The DS system is configured to interact or cooperate with a system providing an access control service aimed at controlling (e.g. detecting, authorizing and/or pricing) user accesses to the service area A, hereinafter referred to as AC ("Access Control") system. According to an embodiment, user subscription to the access control service may be required.

According to an embodiment, the AC system is or comprises an existing AC system. According to an embodiment, the AC system may be or comprise an electronic toll collection (ETC) system.

In the following, only relevant modules of the DS system and of the AC system that are deemed pertinent for the understanding of the present invention will be discussed, with well-known and/or obvious variants of the relevant modules that are omitted for the sake of conciseness.

The term "module" is herein intended to emphasize functional (rather than implementation) aspects thereof. Indeed, without losing generality, each module, according to its function, may be implemented by software, hardware, and/or a combination thereof. Moreover, the modules (or at least a subset thereof) may also reflect, at least conceptually, the physical structure of the DS and AC systems. In any case, it will be appreciated that one or more of the illustrated modules may be integrated together in a single electronic unit.

According to an embodiment, the AC system may comprise an OBU ("On Board Unit") module 105 (such as a radio transponder module) associated with the user vehicle, and an RSE ("Road Side Equipment") module 110.

According to an embodiment, when the user vehicle approaches the access barrier B and passes the RSE module 110, a radio signal from the RSE module 110 triggers the OBU module 105, which transmits back to the RSE module 110 an indication of the user vehicle (such as vehicle data/details): this causes the opening of the access barrier B (e.g., in case the access barrier B is a physical access barrier, as exemplary illustrated) to allow the access of the user vehicle into the service area A.

According to an embodiment, the OBU module 105 may be a dedicated module. According to alternative embodiments, a properly configured and enabled connectable device (such as a mobile phone) located in the user vehicle may act as OBU module, for example by exploiting radio beacon transmission capabilities (if any) of the connectable device.

According to an embodiment, the AC system comprises an access collection module 115 configured to receive information about vehicle accesses, e.g. for pricing vehicle transit and/or use of the road.

According to an embodiment, the access collection module 115 is configured to receive the information about vehicle accesses from the RSE module 110.

According to embodiments, not shown, the AC system may be based on access detection modules other than the OBU 105 and RSE 110 modules.

Just as an example, the access detection modules may be based on automatic recognition technology, the access detection modules being for example configured to automatically recognize a vehicle number-plate and/or other identifying code associated with the vehicle.

Just as another example, the access detection modules may be based on biometric identification, the access detection modules being for example configured to identify a user based on one or more biometric parameters (such as face, fingerprint, iris and voice).

Just as a further example, the access detection modules may be based on user authorization, the access detection modules being for example configured to identify a user based on one or more credentials associated with the user (such as identification documents, badges, passwords, user names, keys).

According to an embodiment, the DS system is configured to interact or cooperate with the mobile communication network MN.

According to an embodiment, the DS system comprises an identification module 120 configured to identify the user device UD associated with the user.

According to an embodiment, the identification module 120 is configured to identify the user device UD by identifying an "International Mobile Subscriber Identity" (IMSI) number (also referred to as phone number), or any other identifier associated with, and univocally identifying, the user device UD.

According to an embodiment, the identification module 120 is configured to identify the phone number, or any other identifier associated with the user device UD, by interacting with (and exploiting functionalities of) the mobile communication network MN.

According to an embodiment, the user device UD is associated with the user at the subscription phase of the user to the dedicated service. Just as a practical, non-limiting example, the user may download a corresponding mobile application on his/her own user device UD, perform the registration phase (e.g., through the mobile application itself) to generate a corresponding user account, associate the user device UD with his/her own user account, authorize the mobile application (e.g., through the mobile application itself) to push notifications to the user device UD and, preferably, to select (e.g., through the mobile application itself) one or more classes or types of dedicated service to be notified/transmitted to the user device UD while in the service area A. In this embodiment, information about user/user device UD association may be stored in the identification module 120 or at a proper entity of the DS system (not shown) communicatively coupled to the identification module 120.

According to an embodiment, the identification module 120 is configured to identify the phone number, or any other identifier associated with the user device UD, by interacting with (and exploiting user information contained in) the access collection module 115 (or any proper entity of the AC system). According to an embodiment, the user information comprises one or more among personal data (including, but not limited to name, surname, address, tax code), license plate of the associated vehicle, and phone number (or any other identifier) of the associated user device UD.

According to an embodiment, the user device UD is associated with the user at the subscription phase of the user to the access control service provided by the AC system. In this embodiment, information about user/user device UD association may be stored in the access collection module 115 (or at any proper entity of the AC system), and fed to the identification module 120 upon detection of user access to the service area A.

According to an embodiment, the personal data of the user and/or license plate are associated with the user at the subscription phase of the user to the access control service provided by the AC system. In this embodiment, information about user/license plate association may be stored in the access collection module 115 (or at any proper entity of the AC system), and fed to the identification module 120 upon detection of user access to the service area A.

According to an embodiment, information about user/license plate association may be stored in the identification module 120, and may be used to identify the associated user device UD upon detection of user access to the service area A: in this embodiment, upon detection of user access to the service area A, the access collection module 115 may communicate to the identification module 120 the license plate of the vehicle, and the identification module 120 may accordingly identify the associated user device UD (e.g., by exploiting the functionalities of the mobile communication network MN and/or based on information about user/user device UD association stored in the identification module 120 (or in any proper entity of the DS system) at the subscription phase of the user to the dedicated service provided by the DS system.

According to an embodiment, the identification module 120 of the DS system is communicably coupled to the RSE module 110 and/or the access collection nodule 115 of the AC system, the identification of the user device UD being for example triggered by the user access to the service area A as detected by the AC system.

As mentioned above, according to an embodiment, a plurality of user devices UD may be associated with a same user during the subscription phase of that user to the dedicated service (and/or during the subscription phase of that user to the access control service). In this embodiment, the identification module 120 may be configured to identify the user device UD associated with the user as the user device UD (or more thereof), among a plurality of user devices associated with the user, that is actually in proximity to (and hence accessible by or available to) the user.

According to an embodiment, the identification module 120 is configured to identify the user device UD, among the plurality of user devices associated with the user, that is actually in proximity to (and hence accessible by or available to) the user according to the position information of the user device UD.

As mentioned above, according to an embodiment, the position information is based on one or more among the network signals (such as radio frequency signal exchange between the user device UD and the mobile communication network MN), the GNSS signals (such as GPS signals received at the GPS receiver of the user device UD), and the beacon signals (such as beacon signal exchange between the user device UD and one or more modules of the AC system or the DS system).

According to an embodiment, the identification of the user device UD carried out by the identification module 120 based on the position information takes place even when a single user device UD is associated with the user; in this embodiment the identification of the user device UD carried out by the identification module 120 may be regarded as a check to ascertain that the associated user device UD is actually close to the user, thus avoiding unnecessary delivery of the dedicated service towards the user device UD when the user cannot access it (and, hence, benefit from the dedicated service).

According to an embodiment, the identification module 120 is configured to determine the position of the user device UD within the service area A.

According to an embodiment, the identification module 120 is configured to determine the position of the user device UD within the service area A based on the above position information (i.e., one or more among network signals, GPS signals and beacon signals).

According to an embodiment, the service area A comprises two or more service sub-areas or sections, such as the service sub-areas $A_1$ and $A_2$ depicted in the figure, the identification module 120 being for example configured to determine, based on the above position information, the position of the user with respect to the service sub-areas $A_1$, $A_2$ (so that, as better discussed in the following, dedicated services differentiated on a service sub-area basis may be delivered to the user).

According to an embodiment, the identification module 120 (or other entity of the DS system) is configured to determine safety conditions associated with the use of the identified user device UD (i.e., whether the identified user device UD can be safely read or checked by the user, for example in order to avoid that the transmission of the dedicated service could cause user distraction and, hence, potentially dangerous conditions). According to an embodiment, the identification module 120 (or other entity of the DS system) is configured to determine the safety conditions associated with the use of the identified user device UD based on one or more among context aware information, biometric recognition, and existence of active communication links between the user device UD and the IVI device(s) (if any).

According to an embodiment, the DS system comprises a content module 125 configured to transmit, through the mobile communication network MN, the dedicated service to the user device UD based on the position of the user within the service area A as determined by the identification module 120.

According to an embodiment, the content module 125 is communicably coupled to the mobile communication network MN. However, although the content module 125 has been exemplary illustrated as external to the mobile communication network MN, embodiments are not excluded in which the content module 125, or at least a subset of functionalities thereof, is physically or logically located within the mobile communication network MN and/or entities of the DS system.

According to an embodiment, the content module 125 is communicably coupled to the AC System, so that dedicated service delivery to the user through the user device UD via the mobile communication network MN can benefit from information contained in both AC and DS systems. This is conceptually represented in the figure by arrow connection between the content module 125 and the access collection module 115.

FIG. 2 shows a swim-lane activity diagram of a method 200 for delivering the dedicated service to a user within the service area A, according an embodiment of the present invention. For the purposes of the present disclosure, the entities involved in the method 200 are those represented in FIG. 1; however, the access barrier B, the OBU module 105 and the RSE module 110 have been omitted in the swim-lane activity diagram shown in FIG. 2, in that they are not relevant for the understanding of the method 200.

According to an embodiment, the method 200 starts when the AC system detects an access of the user (user access) to the service area A (exit branch Y of the decision node 205): in other words, the interaction between the AC system and the DS system is triggered by detection of the user access. According to an embodiment, as long as no user access is detected by the AC system, no actions are performed (as conceptually depicted in the figure by loop connection between the exit branch N of the decision node 205 and the input branch thereof).

According to an embodiment, the user access to the service area A is decreed by the AC system when, after the user vehicle has approached the access barrier B, communication between the RSE module 110 and the OBU module 105 determines the opening of the access barrier B, and the access collection module 115 is informed about it.

According to an embodiment, the method 200 comprises, at the access collection module 115, notifying the user access to the identification module 120 (action node 210).

According to an embodiment, notification of the user access to the identification module 120 comprises transmission of user details allowing to univocally identify the user. According to an embodiment, user details comprise personal details of the user. According to an embodiment, user details comprise an identifier (such as the IMSI number) associated with, and univocally identifying, the user device UD.

According to an embodiment, the method 200 comprises checking whether the user whose access has been detected is a subscriber of the dedicated service (decision node 215). According to an embodiment, this check is performed at the identification module 120. According to an embodiment, this check is performed based on a proper subscriber database including a list (preferably an updatable list) of active subscribers of the dedicated service. According to an embodiment, the subscriber database is stored in the identification module 120 or in a proper entity of the DS system (not shown) communicatively coupled to the identification module 120.

According to an embodiment, if the user whose access has been detected is a subscriber of the dedicated service (exit branch Y of the decision node 215), the method 200 comprises, at the identification module 120, identifying the user device UD (i.e., each user device UD) associated with the user (so as to identify the user within the mobile communication network MN) (action node 220).

According to an embodiment, identifying the user device UD comprises determining the identifier (such as the IMSI number) associated with the user device UD.

According to an embodiment, identifying the user device UD comprises retrieving the identifier (such as the IMSI number) associated with the user device UD.

According to an embodiment, the identifier associated with the user device UD is received from the access collection module 115 (for example, when the user device UD is associated with the user at the subscription of the user to the access control service provided by the AC system).

According to an embodiment, the identifier associated with the user device UD is available at the DS system (e.g., provided at the subscription phase of the user to the dedicated service) and is retrieved by the identification module 120 from a proper memory location or database thereof or from a proper entity of the DS system (not shown) communicatively coupled to the identification module 120.

Back to the decision node 215, if the user whose access has been detected is not a subscriber of the dedicated service, or an active subscriber of the dedicated service (exit branch N of the decision node 215), the method ends.

According to an embodiment, the method 200 comprises determining (or retrieving) the position of the user device UD (action node 225).

According to an embodiment, at action node 225 the method 200 comprises determining (or retrieving) the position of each user device UD associated with the user (so as to identify which user device UD, among the user devices associated with the user, is actually in proximity to the user, as better discussed in the following).

As conceptually represented in the figure by dashed lines, according to an embodiment, the position of the user device UD is determined (or retrieved) by the identification module 120 according to position information provided by (e.g., the position module of) the user device UD. As conceptually represented in the figure by dashed lines, the position information may be based on one or more among GNSS/GPS signals, beacon signals and network signals.

As conceptually represented in the figure by dashed lines, according to an embodiment, the position of the user device UD is determined (or retrieved) by the identification module 120 according to the position information provided by the mobile communication network MN.

According to an embodiment, the determination of the position carried out at action node 225 is reiterated to check whether the user device UD is within the service area A, as better discussed here below.

According to an embodiment, the determination of the position carried out at action node 225 is reiterated periodically or aperiodically.

According to an embodiment, the method 200 comprises checking whether the user device is within the service area A (decision node 230). Broadly speaking, if, based on the position of the user device UD, the user device UD is within the service area A (exit branch Y of the decision node 230), the delivery of the dedicated service takes place (action node 245), otherwise (exit branch N of the decision node 230) the method 200 ends.

As discussed below, the decision node 230 follows each iteration of the determination of the position performed at action node 225. It should be noted that, at a first iteration, the check performed at the decision node 230 may also be regarded as a check to ascertain that the associated user device UD is actually close to the user, whereby the exit branch N of the decision node 230 means that unnecessary transmission of the dedicated service towards the user device UD is avoided when the user cannot access it (and, hence, benefit from the dedicated service).

According to an embodiment, the check performed at decision node 230 is performed for each user device UD associated with the user. In this way, as mentioned above, when a plurality of user devices UD are associated with a same user during the subscription phase of that user to the dedicated service, the check of the position of each user device UD with respect to the service area A performed at decision node 230 also allows identifying which user device UD, among the user devices associated with the user, is actually in proximity to, and accessible by or available to, the user: this avoids unnecessary transmissions of the dedicated service towards user devices that cannot be accessed by the user to benefit from the dedicated service.

According to an embodiment, not shown, at each iteration following the first iteration, action node 225 is performed only for the user device(s) UD that are actually in proximity of the user.

According to an embodiment, the delivery of the dedicated service at action node 245 takes place on a service sub-area basis, as conceptually represented in the figure by decision nodes 235 and 240, discussed here below.

According to an embodiment, if, based on the position of the user device UD, the user device UD is within a service sub-area different from the service sub-area of the previous iteration (for example, because the user device UD has moved from the service sub-area $A_1$ to the service sub-area $A_2$ or vice versa), exit branch Y of the decision node 235, and a dedicated service associated with that (new) service sub-area is available (exit branch Y of the decision node 240), then the dedicated service is delivered to the user device UD (action node 245), e.g., by transmission of a dedicated digital content. According to an embodiment, transmission of the dedicated service to the user device UD takes place through the mobile communication network MN.

If, instead, no change in the service sub-area has occurred (exit branch N of the decision node 235) from the previous iteration, or no dedicated service is available for the current service sub-area (exit branch N of the decision node 240), the position of the user device UD is (re)determined (action node 225) and nodes 230-245 are repeated as discussed above.

According to an embodiment, the position of the user device UD is (re)determined (action node 225) and nodes 230-245 are repeated as discussed above even after ascertaining that a dedicated service is available for the current service section (exit branch Y of the decision node 240). This allows continuously tracking the position of the user device UD to keep on delivering the dedicated service (when available).

According to an embodiment, not shown, the position of the user device UD is (re)determined (action node 225) and nodes 230-245 are repeated as discussed above after a predetermined time period has elapsed since the dedicated service is delivered to the user device UD.

According to an embodiment, not shown, the position of the user device UD is (re)determined (action node 225) and nodes 230-245 are repeated as discussed above upon crossing by the user of a predetermined point of interest (such as a physical or virtual barrier or checkpoint) within a service area or sub-area.

According to an embodiment, not shown, when a dedicated service is available (e.g., exit branch Y of the decision node 240), the dedicated service is delivered to the user device UD upon determining (e.g., by the identification module 120) the safety conditions associated with the use of the user device UD, i.e. whether the digital contents associated with the dedicated service can be safely consulted (e.g., browsed or checked or read or seen or listened) on the user device UD (or on one or more IVI devices, if any) by the user, otherwise no dedicated service is delivered and the method 200 ends.

According to an embodiment, the delivery of the dedicated service may comprise a notification on the user device UD. The notification may for example be a push notification, for example a banner on the top the device screen, a pop up bubble or badge from the button task bar, a dialog box that interrupts and blocks the view of any front running application, and may contain text and/or vocal image message (possibly with the further playing of an alert sound to attract the attention of the user).

According to an embodiment (not shown), the notification may also comprise one or more authorization procedures. The authorization procedure may for example comprise an authorization procedure, i.e. a procedure for authorizing the transmission of the digital data associated with the dedicated service to the user device UD, for example the digital data concerning the service area A, such as road traffic information, weather forecasts along the road, nearby present or future events, and payment (such as toll payment) processing (such as procedure for toll payment through the user device UD rather than through the AC system, information about the toll amount paid or to be paid.

According to an embodiment (not shown), the user may grant (confirm) or deny authorization. Just as an example, the authorization may be granted by touching on the notification or by means of other gesture (for example, by means of a sliding on the notification box), whereas the authorization may be denied by performing no action on (i.e., by ignoring) the notification.

According to an embodiment, the authorization may be considered granted if the gesture on the notification is performed within a prescribed time period, at the end of which the absence of actions on the notification may be interpreted as authorization denied.

The authorization may be particularly (although not exclusively) advantageous when it is desired to give to the user a certain degree of control on passive reception of the digital data on his/her own user device UD: just as an example, the delivery of the digital data could be annoying for the user, such as when the user device UD is, in that moment, handled by another person within the user vehicle, or when the user device UD is, in that moment, performing another (and priority) task (such as an ongoing call or an ongoing navigation itinerary).

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. A method for delivering to a user, through a mobile communication network, a dedicated service restricted to an access-controlled service area, the method comprising:
  upon detection of an access of the user into the access-controlled service area by an access control system controlling accesses of users to the access-controlled service area, identifying a connectable device associated with the user, the connectable device being connected to the mobile communication network;
  determining a position of the connectable device, and
  when, based on the position of the connectable device, the connectable device is within the access-controlled service area, delivering the dedicated service to the user, said delivering the dedicated service comprising providing, through the mobile communication network, one or more digital contents to the connectable device,
  wherein the access control system includes a first device that is located at an entry point of the access-controlled service area and a second device that is co-located with the user and is separate from the connectable device, and the first device detects the access of the user into the access-controlled service area based on receiving a radio signal from the second device at the entry point of the access-controlled service area, and
  wherein the access-controlled service area comprises at least a first and a second service sub-area, and wherein said delivering the dedicated service to the user comprises transmitting, to the connectable device, first or second digital contents of said one or more digital contents depending on the first or second service sub-area, respectively, where the connectable device is located.

2. The method according to claim 1, wherein said determining a position of the connectable device is based on position information determined according to at least one among:
  GNSS signals;
  beacon signals, and
  network signals exchanges between the connectable device and the mobile communication network.

3. The method according to claim 2, wherein said position information is determined at the connectable device and/or at the mobile communication network.

4. The method according to claim 1, wherein said identifying a connectable device associated with the user further comprises checking whether the connectable device is in proximity of the user.

5. The method according to claim 4, wherein said identifying a connectable device associated with the user is based on said determining a position of the connectable device.

6. The method according to claim 1, wherein said identifying a connectable device associated with the user comprises identifying, among a plurality of connectable devices associated with the user, the connectable device that is in proximity to the user.

7. The method according to claim 1, wherein the access-controlled service area is delimited by one or more access barriers, said one or more access barriers comprising one or more physical and/or virtual access barriers.

8. The method according to claim 1, wherein the access control system comprises an electronic toll collection system, and wherein the access-controlled service area comprises a toll road.

9. A system for delivering to a user a dedicated service restricted to an access-controlled service area, the system comprising:
  an identification module configured to, upon detection of an access of the user into the access-controlled service area by an access control system controlling accesses of users to the access-controlled service area, identify a connectable device associated with the user and determine a position of the connectable device;
  a mobile communication network connected to the connectable device;
  a content module configured to deliver the dedicated service to the user when, based on the position of the connectable device, the connectable device is within the access-controlled service area, the content module being configured to deliver the dedicated service to the user by transmitting, through the mobile communication network, one or more digital contents to the connectable device,
  wherein the access control system includes a first device that is located at an entry point of the access-controlled service area and a second device that is configured to be co-located with the user and is separate from the connectable device, and the first device detects the access of the user into the access-controlled service area based on receiving a radio signal from the second device at the entry point of the access-controlled service area, and
  wherein the access-controlled service area comprises at least a first and a second service sub-area, and wherein said delivering the dedicated service to the user comprises transmitting, to the connectable device, first or second digital contents of said one or more digital contents depending on the first or second service sub-area, respectively, where the connectable device is located.

\* \* \* \* \*